United States Patent [19]
Frumerman et al.

[11] 3,910,817
[45] Oct. 7, 1975

[54] METHOD AND APPARATUS FOR REMOVING RADIOACTIVE GASES FROM A NUCLEAR REACTOR

[75] Inventors: Robert Frumerman, Pittsburgh; William W. Brown, Monroeville, both of Pa.

[73] Assignee: Westinghouse Electric Corporation, Pittsburgh, Pa.

[22] Filed: Oct. 17, 1972

[21] Appl. No.: 298,215

[52] U.S. Cl. .................... 176/37; 176/53; 176/30
[51] Int. Cl. .................... G21c 9/00; G21c 19/00
[58] Field of Search ............ 176/37, 52, 53, 30, 31, 176/32

[56] References Cited
UNITED STATES PATENTS

| | | | |
|---|---|---|---|
| 3,015,617 | 1/1962 | Brunings | 176/37 |
| 3,404,067 | 10/1968 | Rendos | 176/37 |
| 3,428,522 | 2/1969 | Müller | 176/52 X |
| 3,437,558 | 4/1969 | Gunson et al. | 176/30 X |
| 3,700,550 | 10/1972 | Shiells | 176/37 |

Primary Examiner—Harvey E. Behrend
Attorney, Agent, or Firm—J. R. Campbell

[57] ABSTRACT

A method for removing radioactive gases from a nuclear reactor including the steps of draining coolant from a nuclear reactor to a level just below the coolant inlet and outlet nozzles to form a vapor space and then charging the space with an inert gas, circulating coolant through the reactor to assist the release of radioactive gases from the coolant into the vapor space, withdrawing the radioactive gases from the vapor space by a vacuum pump which then condenses and separates water from gases carried forward by the vacuum pump, discharging the water to a storage tank and supplying the separated gases to a gas compressor which pumps the gases to gas decay tanks. After the gases in the decay tanks lose their radioactive characteristics, the gases may be discharged to the atmosphere or returned to the reactor for further use.

5 Claims, 1 Drawing Figure

U.S. Patent  Oct. 7,1975  3,910,817
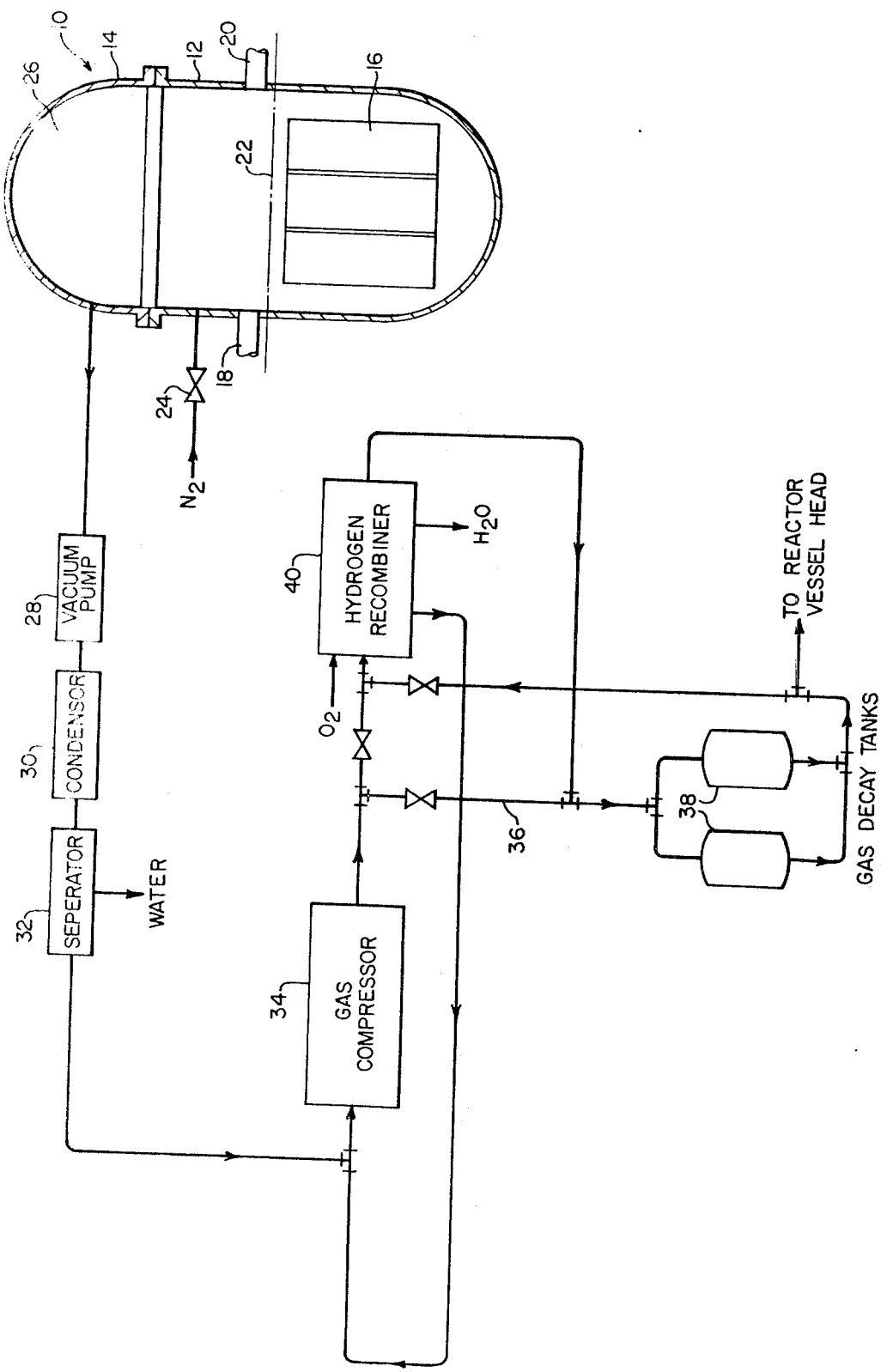

METHOD AND APPARATUS FOR REMOVING RADIOACTIVE GASES FROM A NUCLEAR REACTOR

BACKGROUND OF THE INVENTION

The invention described herein relates to nuclear reactors and more particularly to a system for removing radioactive gases from coolant circulated through the reactor primary cooling system before the reactor is opened up for refueling or other purposes.

During operation of a nuclear reactor small amounts of xenon, krypton and other radioactive gases seep into the coolant circulated through the reactor core. These gases are not harmful to operating personnel so long as they are contained within the closed coolant system. However, as fuel burn-up proceeds to the point where reactor refueling is necessary, or for other reasons which require opening the reactor to the atmosphere, the gases must be purged from the coolant before the reactor head is removed in order to protect operators from the harmful effects of radiation from the radioactive gases. Unless this is done, the radioactive gases readily escape into the reactor containment area normally occupied by workers during reactor refueling and thus establishes a high radioactive environment which is not conducive to safe working conditions.

In recognition of this need, various methods have been developed for effecting gas removal from the core. One known method includes circulating the reactor coolant through a volume control tank connected to the reactor, and alternately lowering and raising the level of coolant in the tank to first permit the radioactive gases to flash out of the coolant into the gas space in the tank, and subsequently displace the gas to gas decay storage vessels. A similar method includes purging a small stream of hydrogen or other non-radioactive gases through the gas space in the volume control tank as coolant is circulated therethrough to effect removal of the gases which then are pumped to gas decay vessels. Another method includes partially draining coolant from the reactor and admitting air to the gas space thus formed in the reactor head and then venting the gases from the reactor through an eductor or aspirator to the atmosphere.

All of the above methods used alone or in combination are either slow and inefficient or result in releases of radioactive gases to the environment. Methods requiring long times to effectively purge the reactor of gases result in a cost for radioactive gas removal which is very high not only from the standpoint of labor costs but also because of revenue loss from extensive plant shutdown.

BRIEF SUMMARY OF THE INVENTION

Briefly stated, the above disadvantages are eliminated by the present invention by providing a system which causes radioactive gases to be flashed into a vapor space from coolant which is circulated at a high rate through the reactor vessel. Release of the radioactive gases and other gases dissolved in the coolant, is based on the concept that gases in the coolant will attempt to achieve equilibrium with the same gases in the vapor space in the reactor. Since gas partial pressure in the vapor space is extremely small and since the solubility of gases in water is low, prompt and efficient flashing of the radioactive gases takes place. These gases thus released from the coolant are withdrawn from the vapor space and pumped to gas decay vessels for subsequent reuse or discharged to the atmosphere when a safe radioactive level is reached.

An object of the invention therefore is to provide a system which promptly and efficiently degases reactor cooling water by flashing radioactive and other dissolved gases into a vapor space provided in the reactor and then removing the gases from the reactor.

Another object of the invention is to provide a reactor coolant degasing system wherein the entire inventory of radioactive gases remaining in the reactor vessel and connected systems, if released to the containment vessel and uniformly distributed therein, would not exceed the concentration in air in which personnel safely can work over extended time periods.

Another object of the invention is to provide a system which is more efficient than present systems used to remove, retain and process radioactive gases from reactor cooling water.

BRIEF DESCRIPTION OF THE DRAWINGS

The subject matter which we regard as our invention is particularly pointed out and distinctly claimed in the concluding portion of this specification. Our invention however, both as to organization and method of operation, together with further objects and advantages thereof, may best be understood by reference to the following description taken in connection with the accompanying drawings in which:

The single FIGURE is a schematic view of a system for removing radioactive gases from reactor cooling water.

DETAILED DESCRIPTION OF THE INVENTION

Referring now to the drawing, there is shown a waste gas system connected to a reactor 10 for removing radioactive gases from coolant circulated through the reactor core. The reactor is of conventional design and as generally shown includes a vessel 12 having a head 14 enclosing a reactor core 16. Coolant inlet and outlet nozzles 18 and 20 are used for circulating coolant through the reactor.

When conditions arise necessitating removal of the reactor head for refueling or opening the reactor for any other reason, radioactive gases must be purged from the coolant before the reactor is opened to the atmosphere. According to the present invention, coolant is drained from the reactor to a level indicated at 22 which is approximately just below the top of the inlet and outlet nozzles. An inert cover gas, such as nitrogen, argon or helium, for example, is introduced through a pressure control valve 24 into the vapor space 26 to bring the total pressure in the reactor vessel to one atmosphere absolute or slightly less. The function of the inert gas is to provide a carrier gas with which the radioactive gases can readily be removed by commercially available vacuum pumps operating between the initial pressure of about one atmosphere and the final pressure slightly above the vapor pressure of the circulating water coolant; further to provide a chemically unreactive atmosphere which will not form a combustible mixture with hydrogen gas which is also released from the coolant. Although the preferred method includes using an initial pressure of one atmosphere of pressure or less, it will be understood that pressures greater than atmospheric may be utilized.

The vapor space is charged to the desired pressure and residual heat removal pumps which are distinct from the primary coolant loop circulating pumps, continue to circulate water coolant through the reactor at a high rate, a function which was in operation before reactor draindown. By doing so, all of the coolant is efficiently exposed to the gas-water interface to therefore provide an opportunity for the dissolved radioactive and other dissolved gases to be released from the coolant into the vapor space. Although the coolant contains numerous radioactive gases, xenon 133 is by far in the greatest amount with only relatively minor amounts of krypton and other noble gases. Xenon therefore is the important gas to be removed and it is known that Xenon in water will flash to nearly 93% of its total amount into the vapor space where the gas-water volumes are in the ratio of 1:1. This major flashing is principally caused by the low solubility of the gases in the water. Since the Xenon partial pressures in the water and vapor space will try to reach an equilibrium condition, regardless of total pressure in the vapor space, the Xenon will rapidly flash from the water as the water is circulated through the reactor.

The residual heat removal pumps continue to circulate the water coolant at a high rate to the water-vapor space interface. Vacuum pump 28 is started to withdraw all gases from the vapor space 26. The water vapor in the gas is mainly condensed in a condensor 30 and then separated in a separator 32. The water is drained to a tank while the gases are pumped by a compressor 34 through lines 36 to decay tanks 38. Since tanks 38 are sufficiently large to accommodate all gases purged from the coolant, the tanks serve as a convenient storage space until the gases lose most of their radioactive characteristics through decay. At that time, they may be returned to the reactor vessel for subsequent refueling, or discharged to the atmosphere. The time between refuelings will be ample for the high activity isotopes to virtually disappear.

Additionally, a portion of gases in tanks 38 may be pumped to a hydrogen recombiner 40 containing a catalyst (not shown) and an oxygen input to effect combination of hydrogen which may also have been removed from the reactor and oxygen to form water which then is condensed and discharged as a liquid from the system. The remaining gases are returned to gas decay tanks 38.

The evacuation of gases from the vapor space 26 continues until the vacuum approaches that permitted by the vapor pressure of water as closely as the vacuum pump characteristics will permit. The pump must be suitable for handling a high vapor percentage relative to the gases pumped.

Decontamination of the gas space above the water coolant can be approximated by a decontamination factor of the pumpdown which is measured by the ratio of the initial to the final partial pressure of the gases:

$$DF = \frac{(Pt - Pw) \text{ initial}}{(Pt - Pw) \text{ final}}$$

where:
$Pt$ = total pressure
$Pw$ = Partial pressure of water, its vapor pressure and
$Pt - Pw$ = partial pressure of gas After evacuation, the admission of inert gas into the vapor space is repeated to again obtain a pressure of one atmosphere or less and evacuation of the released gases by the vacuum pump until the vacuum approaches that permitted by the vapor pressure of water as closely as the pump characteristics will permit. This process is continued for as many cycles as needed to obtain a final total decontamination factor as follows:

$$DF \text{ total} = \frac{\text{initial inventory of gas in reactor vessel}}{\text{required final inventory}} = (D.F.) \text{ cycle } 1 \times (D.F.) \text{ cycle } 2 \times (D.F.)$$

Calculations developed in the making of the present invention showed that 4 hours of evacuation cycling, i.e., two cycles, gives a D.F. of over 2,500, for example. Many variations in the parameters chosen for this process exist, such as, number of pump down cycles, initial cover gas pressure, including pressures above one atmosphere, capacity of vacuum pumps and final pump down pressure may all be varied to suit the time allowed and the D.F. required for the operation.

In view of the above it will be apparent that many modifications and variations are possible in light of the above teachings. It therefore is to be understood that within the scope of the appended claims, the invention may be practiced other than as specifically described.

What is claimed is:

1. A method for removing radioactive and other gases from coolant circulated through a closed nuclear reactor comprising the steps of reducing the level of coolant in said reactor to provide a space bounded by the coolant surface at the reduced level and the exposed inside surfaces of the reactor, the space thus formed by the reduced level of coolant and the inside surfaces of the reactor comprising a vapor space;

circulating said coolant through the reactor to provide a turnover of coolant at the interface between the coolant surface and the vapor space to thereby effect the release of radioactive and other gases from said coolant into said vapor space;

charging said vapor space with an inert cover gas at a pressure of one atmosphere or less;

withdrawing said radioactive gases and all other gases released from the coolant along with the inert cover gas from the reactor vapor space.

2. The method according to claim 1 wherein the coolant is drained from the reactor to a level just below the top of inlet and outlet nozzles connected to the reactor.

3. The method according to claim 1 including the additional steps of continuing the circulation of coolant through the reactor after the vapor space pressure therein is reduced to less than one atmosphere because of withdrawal of said gases from the vapor space;

recharging the vapor space with inert cover gas to a pressure of approximately one atmosphere;

withdrawing the radioactive and other gases released from the coolant into the vapor space, condensing water vapor covered over with the gases, separating the water from gases in a separator, discharging the water to storage tanks and compressing the gases and discharging them to gas decay tanks, in order to reach a desired decontamination factor.

4. The method according to claim 3 wherein the gases discharged to said decay tanks are selectively supplied from the tanks to the reactor or discharged to the earth's atmosphere.

5. The method according to claim 3 wherein the compressed gases from said separator are discharged to a hydrogen recombiner;

supplying oxygen to said hydrogen recombiner to effect the production of water which is condensed and discharged to a tank; and discharging the remaining gases, after production of the water, from said hydrogen recombiner to gas decay tanks.

* * * * *